United States Patent
Kotos

[15] 3,646,398
[45] Feb. 29, 1972

[54] STATIC SWITCH PROTECTIVE CIRCUIT ACTIVATED BY SHORTED COMMUTATION THYRISTOR

[72] Inventor: Peter Kotos, Havertown, Pa.
[73] Assignee: General Electric Company
[22] Filed: July 16, 1970
[21] Appl. No.: 55,365

[52] U.S. Cl. ............................317/33 SC, 321/12, 321/45 C
[51] Int. Cl. ......................................................H02h 7/14
[58] Field of Search .................317/33 SC, 43; 321/45 C, 12

[56] References Cited

UNITED STATES PATENTS 3,407,314  10/1968  Wolff...............................317/33 SC
3,286,131  11/1966  Myers...............................317/33
3,558,983  1/1971   Steen.............................317/33 X Primary Examiner—William M. Shoop, Jr.
Assistant Examiner—Harvey Fendelman
Attorney—J. Wesley Haubner, Barry A. Stein, Frank L. Neuhauser, Oscar B. Waddell and Joseph B. Forman

[57] ABSTRACT

A protective circuit is provided for a thyristor switch connected between an AC source and a load. The switch includes a commutation thyristor and a DC charged commutation capacitor. The protective circuit includes a DC sensitive relay which, when energized, actuates a backup circuit breaker connected in series with said switch to isolate the source from the load. The relay is actuated by the discharge of the commutation capacitor if the commutation thyristor has shorted.

5 Claims, 1 Drawing Figure

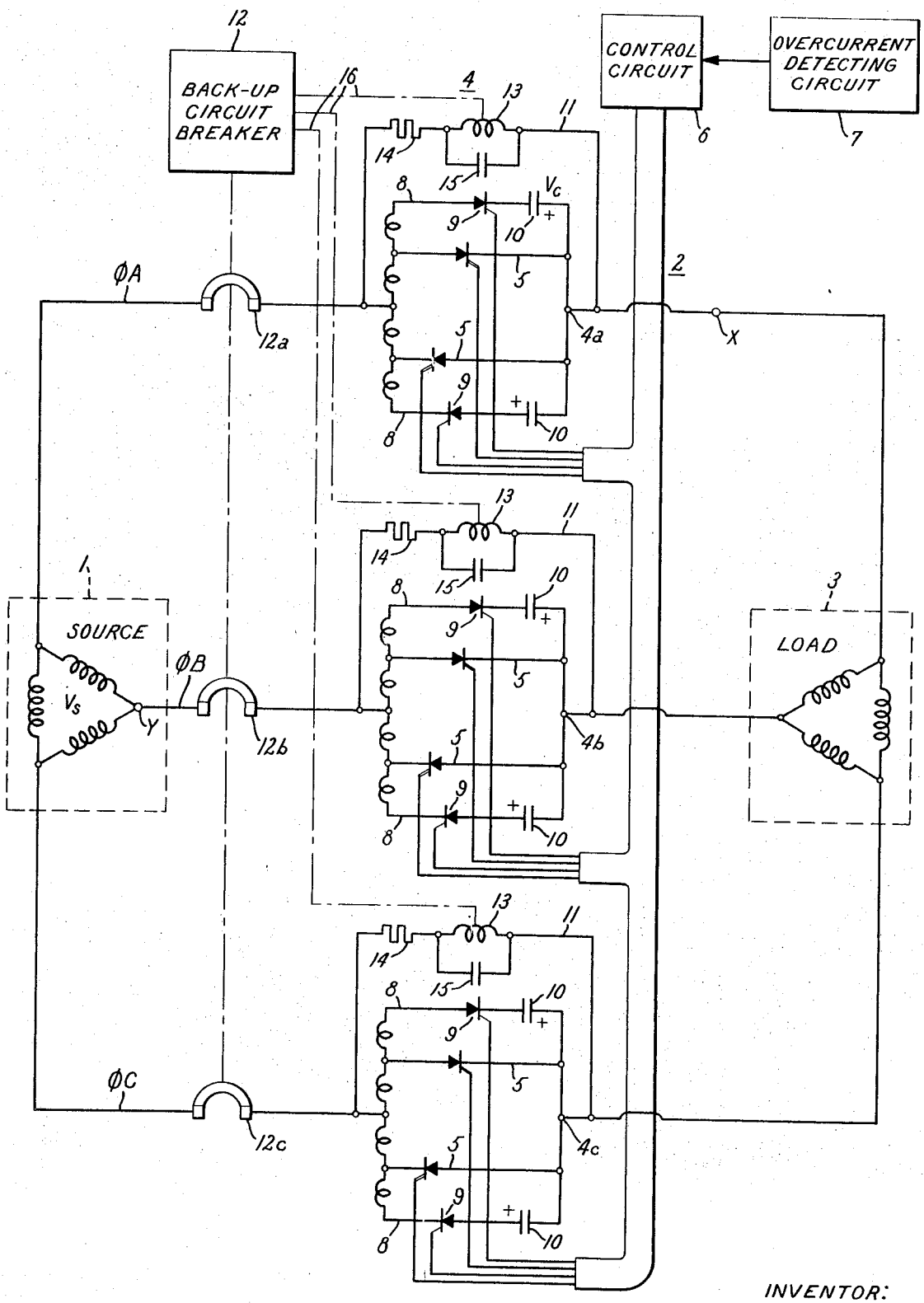

STATIC SWITCH PROTECTIVE CIRCUIT ACTIVATED BY SHORTED COMMUTATION THYRISTER

BACKGROUND AND OBJECTS OF THE INVENTION

This invention relates to electric power switching apparatus and to protective means therefor, and more particularly it relates to a combination of a solid state (thyristor) switch having thyristor controlled commutation means which is intended selectively to permit or to block the flow of electric current between a source and a load and means for insuring isolation of the load from the source in the abnormal event a commutation control thyristor becomes disabled.

In the art of electric power distribution and utilization, it is a common practice to employ switches or circuit breakers in order to initiate or terminate the flow of load current on command from a control circuit. These switches may advantageously be constructed or solid-state controllable switching devices such as thyristors. A silicon-controlled rectifier (SCR) is one type of thyristor commonly used in such switches. Since thyristor switches do not utilize any moving parts for circuit completion or interruption, they are known in the art as static switches. Static switches may be provided with overcurrent protective means to enable them to interrupt the flow of load current in response to a sensed overcurrent of a preselected magnitude.

As is well known, an SCR comprises a body of semiconductor material having a plurality of layers of alternately P- and N-type conductivity which form a plurality of back-to-back rectifying junctions therein. The semiconductor body is disposed between a pair of main electrodes, one known as the anode and the other as the cathode. Thyristors additionally include some form of gating means; (e.g., in a conventional SCR it is the gate electrode) which is operative for initiating current conduction between the anode and cathode. When connected to a source of voltage and a load, an SCR will ordinarily block appreciable current flow between its anode and cathode until triggered or fired by a signal to its gate electrode at a time when its anode is biased positive with respect to its cathode, whereupon it abruptly switches to a relatively low resistance conductive state. Once conducting, the SCR will continue to conduct load current even if no further triggering is provided, so long as the magnitude of current is above a predetermined holding level. When the magnitude of current drops below that level, the SCR switches to a relatively high resistance state whereupon the flow of load current is blocked until the SCR is subsequently retriggered. Therefore when connected to an AC power source an SCR will necessarily cease conducting at the occurrence of a natural current zero.

SCR's are unidirectional controlled switches, therefore, in an AC power distribution system they are normally connected in an inverse parallel configuration to form the static switch in order that both the positive and negative half cycles of the source voltage can be supplied to the load. A control circuit is normally provided for supplying gate signals to the switch or power SCR's to initiate conduction therein. The control circuit may include means for effectuating load current interruption in response to a sensed overcurrent. This may be accomplished by stopping the supply of trigger signals from the control circuit, whereupon the switch or power thyristors would commence blocking load current at the occurrence of the next natural current zero. It should be noted that this manner of current interruption may allow the fault current to build up to dangerous levels before the conducting switch regains its blocking state since interruption can only occur at the current zero following the fault current's detection.

In order to provide current interruption capability within a fraction of a half-cycle of the alternating source voltage, means must be provided to force the conducting power thyristor off (i.e., return it to its blocking state). The process of turning off a conducting power thyristor is known in the art as forced commutation or simply commutation. A static switch equipped with commutation means for interrupting load currents within a fraction of a half-cycle of the detection of a fault is known as a current limiting switch. Such a switch limits magnitude of the fault current to an acceptable level by interrupting the fault current early in its half cycle (i.e., before it reaches its peak magnitude).

One type of circuit useful for commutating a conducting thyristor comprises a charged capacitor connected in series with a thyristor (the thyristor is known in the art as a commutating thyristor, and the capacitor is known as a commutating capacitor). This circuit is placed in shunt with the power thyristor of the static switch. The commutating thyristor is poled in the same direction as the power thyristor and is normally in a nonconductive state. The commutation capacitor is charged to a predetermined DC voltage in opposition to the polarity of the power thyristor and is isolated from the power thyristor by the non conducting commutating thyristor. When a fault current is detected flowing through the system the commutating thyristor is triggered on by its control circuit, this allows the charged commutating capacitor to discharge in the reverse direction through the conducting power thyristor. The commutating capacitor discharge serves to reverse bias the power thyristor and drive the current flowing through it below its holding level, whereupon it turns off (resumes its blocking state).

Although thyristors are solid state devices, and thus are relatively reliable and long lived, nevertheless they may sometimes fail. When a thyristor fails it loses its current-blocking ability and hence acts as a short circuit.

In a power system including a current-limiting static switch, if a commutating thyristor has failed at a time when its associated power thyristor is in its blocking state the charged commutating capacitor would be switched in series with the power source, thereby raising the voltage between the system conductors by the capacitor voltage. The effect of this condition may be to overstress the insulation on closely adjacent system conductors. In a three-phase ungrounded AC power system, housed in grounded metal enclosures, the failure of a commutation thyristor at a time when a system ground fault exists (i.e., a system conductor shorted to ground) may result in aggravated overstressing of the insulation on the system conductors. This is due to the fact that all of the system conductors are in close proximity to the grounded enclosure while one conductor is shorted thereto. Therefore, the commutating capacitor voltage which is added to the system voltage is available to overstress the insulation between the proximate conductors via the grounded conductor and the grounded metal enclosure.

Therefore, it is an object of my invention to provide a protective circuit for a current limiting static switch, having thyristor-controlled commutation circuitry, for isolating the power source from the load in the event that a commutation thyristor has shorted.

SUMMARY OF THE INVENTION

A protective circuit is provided for a current limiting static switch connected between an alternating voltage source and a load in an electric power system. The thyristor switch includes commutation circuitry comprising a normally nonconductive thyristor and an associated capacitor charged to a DC voltage level. Conduction of the static switch is controlled by a control circuit. The protective circuit is adapted to actuate (i.e., open) a normally closed auxiliary circuit breaker, connected in series with the static switch, if the commutating thyristor has shorted.

The protective circuit comprises a first means connected in shunt with the static switch and second means operative upon when direct energization of the first means to actuate the auxiliary circuit breaker. The first means is energized when current begins flowing from the charged capacitor via the shorted thyristor whereupon the second means actuates the auxiliary breaker to isolate the load from the source. Preferably the first means is a coil of an electromagnetic relay, and a filter capacitor is coupled to the relay coil for filtering out alternating current so that said relay is sensitive to direct current alone.

BRIEF DESCRIPTION OF THE DRAWING

The drawing is a partial schematic and partial block diagram of my protective circuit utilized with a static switch in a power circuit.

DETAILED DESCRIPTION OF THE PREFERRED EMBODIMENT OF THE INVENTION

As can be seen in the drawing, an ungrounded three-phase alternating voltage source 1 is arranged to supply power to load 3. In order to initiate or to terminate the flow of current to the load, a circuit breaker is provided between the source and the load. This circuit breaker is denoted as the Static System Protector 2 in that it includes a solid state or static switch 4.

In order to control conduction of the static switch, i.e., initiate or terminate current conduction therein, the Static System Protector also includes a control circuit 6 having two states or modes, namely "ON" and "OFF." The control circuit 6 is arranged to be actuated from its ON to its OFF states (thereby causing the static switch 4 to interrupt the flow of load current) either manually or from a signal provided by suitable automatic means which responds to a sensed fault, such as overcurrent-detecting circuit 7. Further, the Static System Protector preferably includes commutation means to force commutate the static switch in high-speed response to detection of a fault current by detecting circuit 7.

The static switch 4 comprises one thyristor switch for each phase of the power system, namely 4a, 4b and 4c. In order to provide for bidirectional load current conduction, each of the phase switches is shown as comprising a pair of inverse parallel connected thyristor legs 5.

Thyristor legs 5 are shown as having a double gate electrode in order to symbolically represent that each leg may comprise a parallel array of similarily poled high-power thyristor elements. The number of thyristor elements utilized in each leg depends on the desired current handling capability of the switch. Of course it is to be understood that legs 5 may each comprise only a single power thyristor element, if such is desired. To form a higher voltage switch, additional thyristors can be respectively connected in series with those shown, if desired.

Control circuit 6, in its "ON" mode, provides suitable gate signals to the thyristors making up switch 4 to render the switch conductive, whereupon load current is able to flow between the source 1 and the load 3. In its "OFF" mode no gate signals are provided by control circuit 6 to any of the switch thyristors. Hence, when control circuit 6 is in this made the static switch 4 should block the flow of load current.

Each phase switch of the static system protector is equipped with means for rapidly forcing all conducting power thyristors off in response to a sensed fault in that phase. That means includes a pair of commutation circuits 8, each circuit of which is connected in shunt across a respective thyristor leg 5 of the phase switch. Commutation circuits 8 comprise a normally nonconductive commutating thyristor 9 and a serially connected commutating capacitor 10. Capacitor 10 is charged to a DC voltage level, the polarity of which is as shown. A precharging scheme such as that claimed in U.S. Pat. No. 3,098,949—Goldberg can be used if desired. Once charged the capacitor is available to commutate its associated power thyristor when called upon to do so.

If a fault current of a preselected magnitude begins to flow, overcurrent detecting circuit 7 is energized and immediately provides a "Stop" signal to control circuit 6. Upon receipt of the "Stop" signal, control circuit 6 ceases supplying gate signals to the power thyristor legs 5. At the same time control 6 begins supplying gate signals to the normally nonconductive commutating thyristors 9 in order to trigger them into conduction. Once a commutating thyristor 9 begins conducting its associated charged commutating capacitor 10 begins discharging through the associated thyristor leg 5 in the reverse direction (i.e., cathode to anode), whereupon the conducting thyristor leg 5 is quenched.

The above described sequence of events can occur within a few microseconds from the time a fault of preselected magnitude is sensed. Therefore, the fault current which is permitted to flow can be limited to an acceptable magnitude, (i.e., well below the available peak fault current magnitude) by virtue of the rapid response of the static system protector.

As is well known in the art, the apparatus shown in the ungrounded three phase system of the drawing is conventionally housed in equipment racks or cabinets (not shown) which are preferably grounded to ensure personnel safety. All of the illustrated power distribution circuits and other electrically alive parts of the switching apparatus will in practice be mounted in the cabinets by suitable insulators in the usual fashion. In the event that a commutating thyristor shunting a blocking power thyristor leg fails (i.e., acts as a short circuit), its associated commutating capacitor will be switched into series between the power source and the load across the blocking thyristor leg, whereupon the DC voltage to which the capacitor was raised will be added to the normally existing source voltage in the system. If at this time one of the phase conductors is shorted to ground (this condition being hereinafter referred to as a ground fault), the sum of the commutating capacitor voltage and the source voltage would appear across the insulation between the grounded cabinet and an energized, ungrounded, phase conductor. The occurrence of this sum voltage may overstress the insulation between said conductor and the cabinet.

This situation can be better appreciated by reference to the drawing and the following set of exemplary assumptions: (1) that the static switch 4 is in its OFF mode; (2) that commutating thyristor 9 of switch 4a is behaving as a short circuit; (3) that the phase A conductor has shorted to ground at point $X$ and (4) that phase B is energized. Under those conditions the voltage existing between point X and point Y (i.e., a point on the phase B conductor) would be equal to the sum of the source voltage $V_s$ and the commutating capacitor voltage $V_c$. Owing to the fact that the phase conductors are closely adjacent the grounded equipment cabinets in a number of places, e.g., the phase transformer coils of the power source may be closely adjacent the cabinet housing them, the voltage between phase B and grounded phase A would necessarily appear across the insulation separating the phase B conductor from the cabinet. The excess or commutating capacitor voltage $V_c$ when added to the normally existing source voltage may prove sufficient to overstress the insulation between phase conductor B and the cabinet.

It should be appreciated that even absent a ground fault, capacitor voltage $V_c$, if impressed on the system by a shorted commutating thyristor, would still increase the relevant phase-to-phase voltage of the system. Such an occurrence could result in overstressing the insulation between such phases where their conductors are closely adjacent.

In order to minimize if not preclude the chance of overstressing conductor insulation in the abnormal event that a commutating thyristor has failed, I have provided a protective circuit 11 adapted to isolate the power system load from the source in response to detection of the thyristor's failure. In particular, my protective circuit is adapted to initiate interruption of a normally closed auxiliary switch or back up circuit breaker in rapid response to detection of a shorted commutating thyristor.

As can be seen in the drawing, an auxiliary or back up circuit breaker 12 is included in the power system. Breaker 12 includes one normally closed pair of main contacts for each of the three phases of the system, namely 12a, 12b and 12c. Backup circuit breaker 12 also includes actuating means, not shown, which upon being energized causes the main contacts 12a, 12b and 12c to open. When the main contacts are open isolation between the source 1 and load 3 is effectuated.

Protective circuit 11 preferably includes fast acting relay means for energizing the actuating means of circuit breaker 12. As can be seen, a relay coil 13 is connected in parallel with each of the phase switches 4a, 4b and 4c. An AC filter capacitor 15 is connected in shunt with the coil 13. A current-limiting resistor 14 is connected in series with coil 13. Capacitor 15 is utilized so that any alternating current, which would normally flow through the protective circuit 11 when the backup breaker 12 is closed and the static switch 4 is not conducting load current, is shunted away from coil 13, whereby during normal switch operation said coil remains unenergized.

In the abnormal event that a commutating thyristor fails its associated charged commutating capacitor would begin discharging direct current through the failed thyristor and relay coil 13. Once coil 13 is energized by the discharge of current therethrough, the contacts of this relay effect actuation of the backup circuit breaker 12, as is represented symbolically by the broken lines 16 in the drawing. When so actuated, the backup breaker opens its main contacts 12a, 12b, and 12c.

While I have shown and described a particular embodiment of my invention, it will be obvious to those skilled in the art that various changes and modifications may be made without departing from my invention in its broader aspects; and I therefore, intend herein to cover all such changes and modifications as fall within the true spirit and scope of my invention.

What I claim and desire to secure by Letters Patent of the United States is:

1. In a power system including a thyristor switch adapted to conduct load current between a voltage source and a load, a control circuit for controllably initiating conduction in said thyristor switch, a commutation circuit coupled to said thyristor switch and selectively operative for rapidly terminating conduction in said thyristor switch, said commutating circuit including a charged capacitor connected in series with means for normally blocking the flow of current therethrough, and a normally conductive auxiliary switch connected in series with said thyristor switch, the improvement comprising: protective means coupled to said commutation circuit and to said auxiliary switch, said protective means being operative for causing said auxiliary switch to become nonconductive in rapid response to a discharge of current from said capacitor thereby ensuring that said load is electrically isolated from said source.

2. The power system as specified in claim 1 wherein said protective means comprises a relay having first means arranged to be energized upon a discharge of current from said capacitor and second means responsive to the energization of the first means for causing said auxiliary switch to become nonconductive.

3. In a power system including a thyristor switch adapted to conduct load current between an AC power source and a load, a control circuit for controllably initiating current conduction in said thyristor switch, a commutation circuit connected in parallel to said thyristor switch and selectively operative for rapidly terminating conduction in said thyristor switch in response to a sensed load abnormality, said commutation circuit comprising a commutating thyristor in series with a capacitor charged to a DC voltage level, and a normally conductive auxiliary switch connected in series with said thyristor switch, the improvement comprising: protective means coupled to said commutation circuit and to said auxiliary switch said protective means being operative for causing said auxiliary switch to become nonconductive in response to a flow of current in said commutation circuit thereby ensuring that said load is electrically isolated from said source, said protective means comprising: an energizable relay circuit shunting said commutation circuit, and filter means for filtering out alternating current.

4. The power system as specified in claim 1 wherein said protective means is connected in parallel with said commutating circuit.

5. The power system as specified in claim 4 wherein said protective means comprises a relay having first means arranged to be energized upon a flow of current in said commutating circuit and second means responsive to the energization of the first means for causing said auxiliary switch to become nonconductive.

* * * * *